May 14, 1940.　　　T. J. KAUFMAN　　　2,201,095
BALL BEARING FAUCET
Filed Feb. 26, 1938
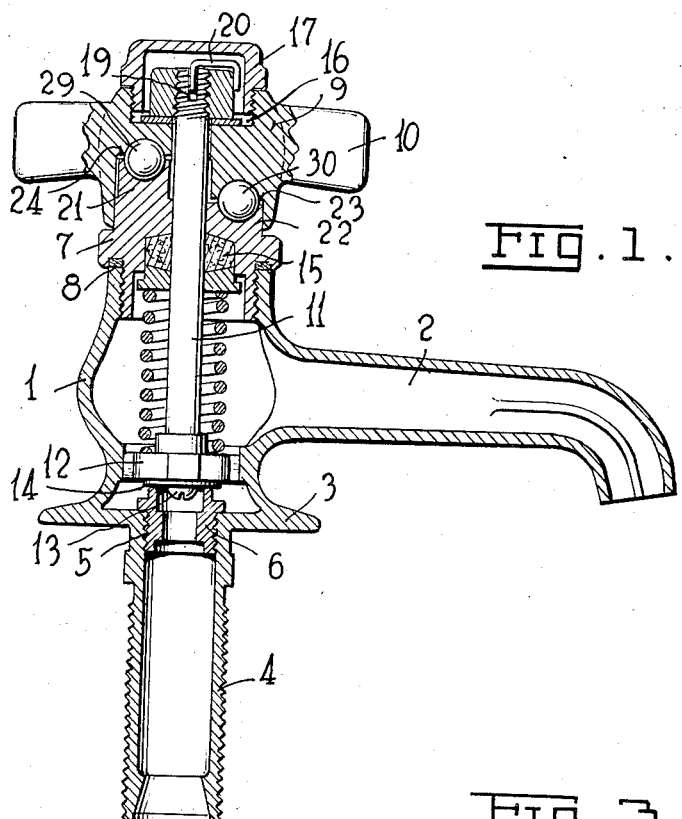
Fig. 1.
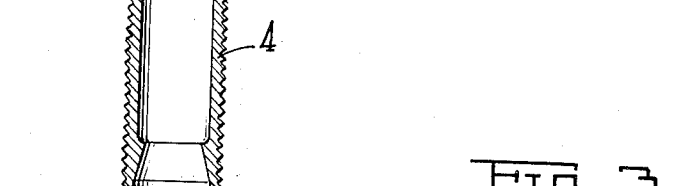
Fig. 2.
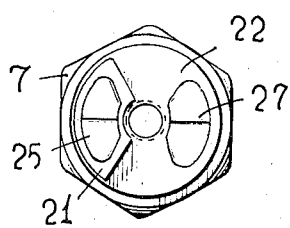
Fig. 3.
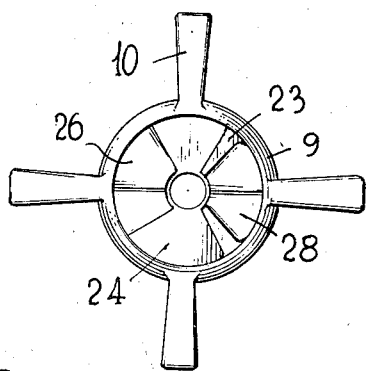
Fig. 4.
Fig. 5.
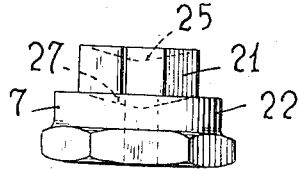
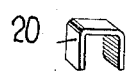
Inventor
Tobias J. Kaufman
By R. Clyde Grant
Attorney Patented May 14, 1940

2,201,095

UNITED STATES PATENT OFFICE 2,201,095

BALL BEARING FAUCET

Tobias J. Kaufman, Chicago, Ill.; Mabelle G. Kaufman, executrix of said Tobias J. Kaufman, deceased, assignor to Eljer Company, Ford City, Pa.

Application February 26, 1938, Serial No. 192,861

5 Claims. (Cl. 251—132)

This invention relates to certain improvements in valves and more particularly to a self-closing faucet of the reciprocating disk or plug type, operated by opposed cam and spring action.

This general arrangement is a well known combination in the art, the present invention involving novel features pertaining to details of construction and operation of the movable parts of this type of faucet.

More specifically the cam action in most of these faucet constructions above referred to, is produced by a series of balls, mounted between cam surfaces or inclined planes, the planes adapted to separate when the upper one is turned either right or left from neutral position.

The valve stem, carrying the valve disk or plug, is normally held in closed position by a bronze spring of suitable tension encircling the stem, and said stem is rotatably secured to the upper plane which is provided with an operating handle, so that a turning of the handle opens the faucet. Upon a release of the handle the spring will return the valve to its seat.

Many different faucet constructions have been produced and many patents have been obtained, covering details such as adjustments to take up wear and resulting "lost motion" in the handle and practically all makes have a shoulder or the like on the valve stem to act as a stop to limit the throw of the handle. This is satisfactory, and works very well when the faucet is new, but places undue strain on the stem should extra effort be exerted on the handle when the stop is reached, especially when the faucet has become worn.

Very often, in the ball and cam type of faucet, if the slack or lost motion is not taken up, the balls will climb over the top of the incline into the next pocket. To overcome this some manufacturers have mounted the balls in a retainer or cage, but this still does not prevent the handle, after the faucet has become worn, from being turned over and over or stopped on center permitting the water the water to run continuously, and thereby rendering the faucet useless for the purpose intended.

The chief reason these balls in these prior constructions become displaced and climb over the top of one cam into the pocket of the next cam and jam, is that these balls and cams are all in substantially the same horizontal plane.

The particular novel feature of the present invention is in the arrangement of cams and balls so that there is no possibility of the balls becoming misplaced or disengaged from their respective cam surfaces, nor is it necessary to provide the usual shoulder or stop on the valve stem.

These results are accomplished first, by using preferably two balls positioned on opposite sides of the stem but on different levels or in different horizontal planes, and second, by mounting these balls in pockets or depressions which are of such circumferential extent and contour that they engage to a positive stop after the handle has been turned to give the desired opening of the faucet. This further eliminated the usual stop on the valve stem, said stem being of uniform diameter throughout as shown.

An additional feature resides in the means and manner of securing the upper end of the valve stem to the operating member or handle. This means includes a nut threaded on the upper end of the stem engaging an internal annular shoulder formed in the operating member, the said upper end of the valve stem being slotted to receive one leg of an inverted U-shaped key member, the other leg thereof being adapted to closely engage one of the side faces of the nut. This is a very simple device, inexpensive to manufacture and efficient and much easier to adjust than the castellated nut and cotter pin or lock nuts heretofore employed.

The preferred embodiment of the invention is illustrated in the accompanying drawing, in which Figure 1 is a vertical transverse sectional view, substantially full size of the improved faucet;

Figure 2 is a top plan view of the lower cam member formed on the stationary part of the valve body;

Figure 3 is a bottom plan view of the upper cam member carried by the rotatable or handle portion of the valve body ;

Figure 4 is a side elevational view of Figure 2; and

Figure 5 is a detailed view of the locking key member for the upper end of the valve stem, as shown in the assembled device in Figure 1.

Referring to the drawing in detail the improved faucet comprises a body portion 1 provided with a discharge nozzle 2 and a flanged base portion 3, said base portion carrying a downwardly extending threaded member 4 by which the faucet is connected to the source of water supply and at the same time providing a means for securing said faucet in operative position.

The base 3 is interiorly threaded as at 5 to receive a removable valve seat 6.

Threaded into the upper part of the valve body 1 is a head portion 7 adapted to be tightly set up against a washer or similar packing 8 whereby a water tight joint is provided at this point of connection.

Positioned on the head portion 7 is a rotatable cap or operating member 9 said rotatable member being provided with radiating projections or hand gripping members 10 of any desired design for operating the valve mechanism of the faucet, to be hereinafter described.

Mounted concentrically of the parts above described is a valve stem 11 provided at its lower end with a valve disk or plug 12 secured in position by a screw or the like 13, said screw 13 holding in place a washer or similar packing 14 which is adapted to engage the valve seat 6. The annular edge of the valve disk or plug is formed with short extensions or projections whereby the said valve is centered in the body portion 1 of the faucet as shown in Figure 1. The valve stem 11 is of uniform diameter throughout and passes upwardly through the relatively stationary head 7 and the rotatable cap or operative member 9, said valve stem where it passes through said head 7 being provided with a packing 15.

The upper face of the rotatable cap 9 is constructed with a circular recess 16 and said recess is provided with a cover piece or closure 17.

The extreme upper end of the valve stem 11 is threaded and extends into the circular recess 16 in position to receive a nut or the like 18, the upper end of said valve stem being also provided with a transverse slot or deep groove 19. Cooperating with this groove 19 and one of the outer side faces of the nut 18, is an inverted U-shaped key member 20 whereby after the key member is inserted in position as shown and the cover piece or closure 17 is secured in place, a novel interlock will be provided for maintaining said valve stem in the desired postion, and at the same time the rotatable member 9 will be retained in an operative relation with respect to the stationary head portion 7.

The upper face of the stationary head 7 is constructed with a raised boss or extension 21 (Figs. 1, 2 and 4) and a lower ledge portion 22 and correspondingly the under face of the rotatable member 9 is provided with a downwardly extending boss or the like 23 and a stepped ledge portion 24.

The abutting faces of these stepped portions 21, 24 and 22, 23, are provided with cam recesses 25, 26 and 27, 28 respectively between which are positioned balls or the like 29 and 30.

With this construction and arrangement, a rotation of the operating member 9, in either direction will cause a lifting of the said operating member 9 and with it the lifting of the valve stem 11. Working in opposition to this lifting means is a coil spring 31 of the proper size and strength, which spring automatically returns the valve stem to its original position as soon as the handle or operating member 9 is released. With this improved stepped cam construction it will be noted that the operating member 9 cannot make a complete revolution and therefore provides in itself a stop and prevents any possibility of the balls becoming engaged or jammed one with the other, which is one of the chief disadvantages of the prior ball and cam constructions, where the said balls and cams are in the same horizontal plane. Furthermore the construction of the valve stem is simplified in that no shoulder or flange is required on the valve stem to act as a stop as in prior constructions.

From the foregoing description it is believed that the operation of the device will be perfectly obvious.

Although balls have been shown and described in the present instance the broad idea of the stepped cam arrangement is also applicable to any preferred type of antifrictional bearings within the scope of the invention as claimed.

What I claim is:

1. In a valve, the combination with a reciprocating stem, of a stationary part and a rotatable part, means for securing the valve stem to said rotatable part and cam means interposed between said rotatable and stationary parts, said cam means being located in vertically spaced disconnected and independent surfaces.

2. In a valve, the combination with a reciprocating stem, of a stationary part and a rotatable part, means for securing the valve stem to said rotatable part, cam means interposed between said rotatable and stationary parts for lifting said stem, said cam means being located in vertically spaced disconnected and independent surfaces and a spring for returning said stem to its original position.

3. The combination with a valve body, of a valve seat, a valve and valve stem, said valve body comprising a stationary part and a rotatable part, means for securing the valve stem to said rotatable part, cam means disposed on diametrically opposite sides of said valve stem and interposed between said rotatable and stationary parts for lifting said valve stem, said oppositely disposed cam means being located vertically spaced disconnected and independent surfaces and a spring for returning said valve to its original position.

4. The combination with a valve body for faucets, of a valve, valve seat and valve stem, cam means for opening said valve and a spring for closing the valve, said cam means being carried by the body portion on diametrically opposite sides of the valve stem, said diametrically opposite cam means being located in vertically spaced disconnected and independent surfaces.

5. The combination with a valve body for faucets, of a valve, valve seat and valve stem, said valve stem being of uniform diameter from end to end, cam means for opening said valve and a spring surrounding the valve stem for returning the valve to closed position, said valve body being transversely divided into vertically spaced disconnected and independent surfaces and the said cam means being carried by said vertically spaced surfaces.

TOBIAS J. KAUFMAN.